(12) United States Patent
Panni et al.

(10) Patent No.: US 10,717,033 B2
(45) Date of Patent: Jul. 21, 2020

(54) FILTER ELEMENT AND METHOD FOR MANUFACTURING A FILTER ELEMENT

(71) Applicant: MANN+HUMMEL GmbH, Ludwigsburg (DE)

(72) Inventors: Andreas Panni, Oestringen-Odenheim (DE); Klemens Dworatzek, Edingen (DE); Janine Schmelzle, Karlsruhe (DE); Frank Vogt, Hanhofen (DE); Goekhan Evcuemen, Hanhofen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 108 days.

(21) Appl. No.: 15/694,905

(22) Filed: Sep. 4, 2017

(65) Prior Publication Data
US 2017/0361261 A1    Dec. 21, 2017

Related U.S. Application Data

(63) Continuation of application No. PCT/EP2016/053761, filed on Feb. 23, 2016.

(30) Foreign Application Priority Data

Mar. 3, 2015  (DE) .......................  10 2015 002 673

(51) Int. Cl.
*B01D 46/00* (2006.01)
*B01D 46/24* (2006.01)
*B01D 46/52* (2006.01)

(52) U.S. Cl.
CPC ..... *B01D 46/2414* (2013.01); *B01D 46/0001* (2013.01); *B01D 46/003* (2013.01);
(Continued)

(58) Field of Classification Search
CPC .......................... B01D 46/00; B01D 46/0001; B01D 46/0005; B01D 46/0024; B01D 46/003;
(Continued)

(56) References Cited

U.S. PATENT DOCUMENTS 5,605,555 A  *  2/1997  Patel ................... B01D 46/2414
                                                          55/502
2006/0108280 A1    5/2006  Wijadi
(Continued)

FOREIGN PATENT DOCUMENTS

CN       101060904 A    10/2007
DE         1753651 U    10/1957
(Continued)

*Primary Examiner* — T. Bennett McKenzie
(74) *Attorney, Agent, or Firm* — James Hasselbeck

(57) ABSTRACT

A filter element (100) that is to be mounted in a housing (102) has at least one substantially hollow cylindrical pleated filter (10, 20) designed to separate liquid from aerosol, and two cover elements (30, 40) designed to cover axial end regions (12, 14, 22, 24) of the pleated filter (10, 20). The axial end portions (12, 14, 22, 24) of the at least one pleated filter (10, 20) are pressed against the cover element (30, 40) by an axial compressing force. The at least one pleated filter (10, 20) is secured in the axial direction, and one respective sealing zone (16, 18, 26, 28) is formed between each pleated filter (10, 20) and each cover element (30, 40).

12 Claims, 11 Drawing Sheets

(52) U.S. Cl.
CPC ..... *B01D 46/0005* (2013.01); *B01D 46/0024* (2013.01); *B01D 46/2403* (2013.01); *B01D 46/2411* (2013.01); *B01D 46/521* (2013.01); *B01D 2265/04* (2013.01); *B01D 2271/022* (2013.01)

(58) Field of Classification Search
CPC ............ B01D 46/2403; B01D 46/2411; B01D 46/2414; B01D 46/521; B01D 2265/04; B01D 2271/022
USPC .................................................. 55/490–519
See application file for complete search history.

(56) References Cited

U.S. PATENT DOCUMENTS

| | | | |
|---|---|---|---|
| 2009/0020486 A1* | 1/2009 | Barnwell | B01D 46/003 210/803 |
| 2014/0157738 A1 | 6/2014 | Eberle | |

FOREIGN PATENT DOCUMENTS

| | | |
|---|---|---|
| DE | 1116635 B | 11/1961 |
| DE | 8814236 U1 | 2/1989 |
| DE | 29709885 U1 | 8/1997 |
| DE | 102004005210 A1 | 8/2005 |
| DE | 102009010998 A1 | 9/2010 |
| WO | 9628238 A1 | 9/1996 |

\* cited by examiner

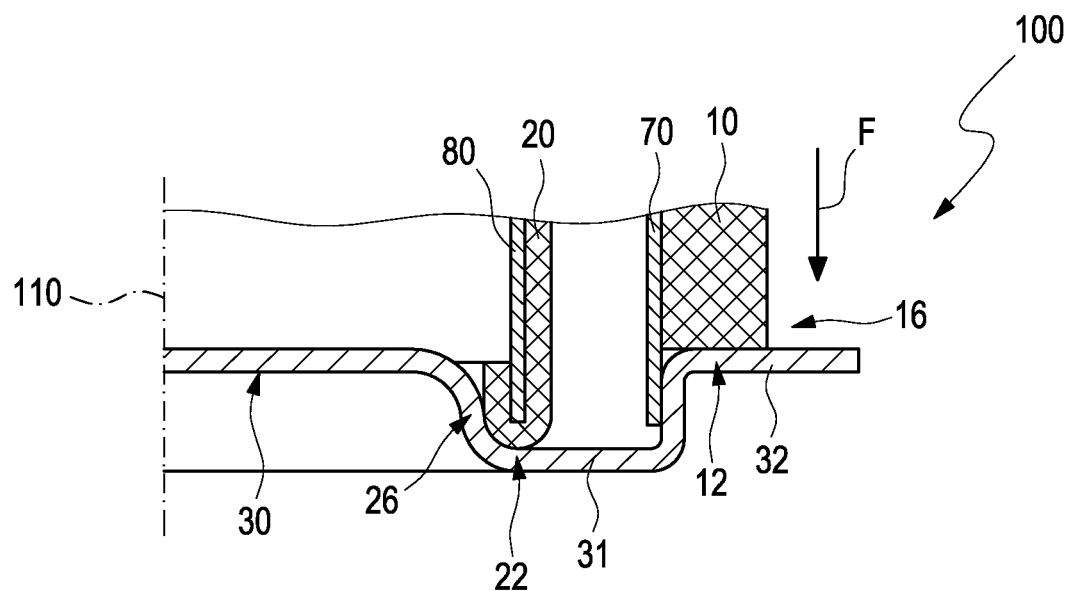
Fig. 11
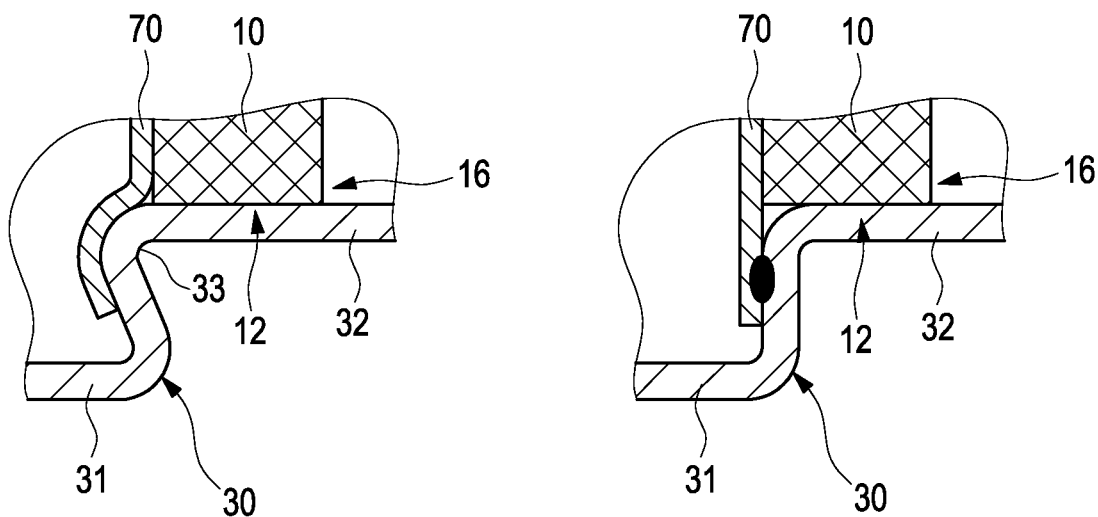
Fig. 12
Fig. 13

FILTER ELEMENT AND METHOD FOR MANUFACTURING A FILTER ELEMENT

TECHNICAL FIELD

The invention relates to a filter element for installation in a housing, in particular in a pressure vessel, comprising at least one substantially hollow cylindrical pleated filter for separating liquid from an aerosol, in particular oil from aerosol, for example for de-oiling of air, for example at least one cylindrically wound separator element.

BACKGROUND

A filter is known from WO 2013 024105 A1 for the de-oiling of air originating from an air compressor or a vacuum pump. In this filter, a sealing connection between the pleated filters and a U-shaped groove of a cover element of the filter is produced through the use of an adhesive or a sealant. However, the use of adhesives for fixing the pleated filters is expensive and additionally problematic due to the partial uncertainty of the chemical and thermal stability.

Another filter insert is known from WO 96 28238 A1. In this filter element, a pleated filter wound on a support tube is connected by means of a flange connection or flanging with a mounting flange of the filter housing. A flange is understood here as a connection which is produced through right-angle bending of an edge of a round or oval metal sheet. The flange connection known from WO 96 28238 A1 enables the omission of an adhesion of the pleated filter on the end faces of the filter element. In order to produce this flange connection, a flange ring is arranged in the end region of the air de-oiling element. This flange ring is a separate element which is not integrated in the end face cover element of the filter element. The flange ring itself is not flanged, but rather serves as a counter support for a bead introduced in the mounting flange and the support tube.

SUMMARY

The object of the invention is to develop a filter element of the aforementioned type and a method of the aforementioned type such that the filter element is designed in a compact manner and is inexpensive and easy to manufacture.

This object is achieved by a filter element that is provided for installation in a housing, comprising at least one substantially hollow cylindrical pleated filter and two cover elements designed to cover axial end regions of the pleated filter, wherein the respective axial end regions of the at least one pleated filter are pressed against the covering element with an axial compression force, and a respective sealing region is formed between pleated filter and cover element. Advantageous embodiments and advantages of the invention follow from the claims, the description, and the drawings.

A filter element that is to be installed in a housing is proposed, wherein the filter element comprises at least one substantially hollow cylindrical pleated filter designed to separate liquid from aerosol, and two cover elements designed to cover axial end regions of the pleated filter. The respective axial end regions of the at least one pleated filter are each pressed against the cover element using an axial compressing force. The at least one pleated filter is fixed in the axial direction, and a respective sealing zone is formed between pleated filter and cover element.

The filter element is preferably provided for operating pressures of at least 50 mbar, particularly preferably for operating pressures of at least 200 mbar. An operating pressure of at most 1 bar is advantageous. For other applications, for instance as a filter element in the field of compressors, the filter element can be designed for different, in particular higher, operating pressures.

The filter medium of the filter element can consist in particular of non-woven fabric. The pleated filter can be designed as a multi-layer wrapping or also as a single-layer cylinder. More than one pleated filter can also be provided, in particular a primary filter and a secondary filter. The cover element can in particular be an end plate and can be made of metal or plastic.

Particularly advantageously, due to the axial compression the pleated filter, at its end region in the compressed region, can assume a sealing function relative to the cover element which is sufficient in order to be able to omit the adhesive or sealant. The sealing function is assumed at this location by a filter medium of the pleated filter or of a group of pleated filters. In spite of the fundamental permeability of the filter medium, the permeability is low enough that, even at operating pressure, the sealing function is maintained when the filter element is used as intended. The contact pressure of the pleated filter against the cover element is advantageously selected appropriately for the purpose for which the filter element is to be used.

According to an advantageous embodiment of the filter element, at least one of the sealing regions between pleated filter and the respective cover element can be formed in each case by the axial end region of the at least one pleated filter, which can lie flush against the respective cover element. Alternatively, at least one of the sealing regions can be formed by a pleated filter unit, in which case the axial end region of the pleated filter can lie against at least one further pleated filter, in particular an annular pleated filter. Both axial end regions of the filter element can be sealed in the same way, or a pleated filter can be used on one end region of the compressed pleated filter and a pleated filter unit can be used on the other end region. In principle, however, it is also conceivable for the pleated filter to be provided with adhesive or sealant at one of its end regions, thereby producing and sealing the connection to the cover element.

Providing the sealing function by means of a compressed end region of the pleated filter or pleated filter unit has the advantage that the filter media used are usually more chemically durable in comparison to adhesive and sealant, which is advantageous for the reliability and the service life of the filter element.

According to an advantageous embodiment of the filter element, one or more tension anchors can be provided for the axial compression of the pleated filter, in which case a support tube of the pleated filter can be particularly provided as a tension anchor and/or a protective element radially surrounding the outer pleated filter can be particularly provided as a tension anchor. One or more traction rods can also be passed through the cover element. These provisions can also be combined with one another. A secure abutment of the pleated filter on the cover element is advantageously ensured by one or more tension anchors, even when the filter element is operated under operating pressure.

According to an advantageous embodiment of the filter element, a support tube of the pleated filter can be welded to at least one of the cover elements in order to achieve axial compression. If a plurality of pleated filters are provided, it is advantageous if all pleated filters are provided with support tubes.

According to an advantageous embodiment of the filter element an axial extension of the pleated filter can be greater than that of its support tube. As a result, an axial compression of the pleated filter in its end region can be achieved in a particularly simple manner.

The filter insert has two cover elements; during the manufacture of the filter element, both cover elements are arranged on mutually opposing axial end regions of the pleated filter and the pleated filter is respectively connected in each of its axial end regions to one of the cover elements. In the present invention, both cover elements in the different variants can be simultaneously connected to the pleated filter. In the prior art, by contrast, in which the pleated filter is connected to the cover elements by means of adhesion, a first axial end region of the filter element is first adhered to the cover element associated therewith, upon which it is necessary to wait until the adhesive is dry and only then can the opposite axial end region of the filter element be adhered to the cover element associated therewith.

The manufacture of a filter element for installation in a housing can be advantageously carried out such that a hollow cylindrical pleated filter or pleated filter unit designed for separating liquid out of an aerosol is compressed by an axial compression force in the axial direction against a cover element designed for covering an axial end region of the pleated filter or pleated filter unit, and also an axial fixing of the pleated filter or pleated filter unit takes place while the axial compression is maintained.

According to an advantageous embodiment of the filter element, the axial compression can be formed by welding a support tube and/or a tension anchor and/or a mechanical connection between the cover element and the pleated filter purely through a structure of the cover element produced by the deforming or reforming of the cover element, it being possible for the structure of the cover element to be designed so as to clamp the pleated filter to the cover element.

Therefore, according to this advantageous embodiment, the present invention is based on the principle of clamping the pleated filter on the cover element solely by means of deformation of the cover element. The deformation of the cover element is preferably achieved using the technique of beading or flanging.

In an advantageous embodiment of the present invention, a sealed, in particular gas-tight connection between the pleated filter or between at least one of the pleated filters and the cover element or at least one of the cover elements is produced through the deformation of the cover element.

The cover element can be at least one end plate made particularly of metal, in which case the end plate covers the front face of the pleated filter and at least one region of the lateral surface of the pleated filter near the front face and is connected to the pleated filter in such a way that the clean side of the pleated filter is separated from the environment in a gas-tight manner.

The mechanical connection between the cover element and the pleated filter is formed purely by the structure of the cover element produced by the deforming or reforming of the cover element, with this structure being designed to clamp the filter element to the pleated filter in a manner so as to be secure against slipping.

Advantageously, the structure has at least two cover element beads which form a flange that is integrated into the cover element.

In an advantageous embodiment of the present invention, the at least one pleated filter is received in a U-shaped groove in the cover element, in which case, in order to connect the cover element to the pleated filter, the two sides of this U-shaped groove have at least one cover element bead and the cover element beads are designed to clamp the pleated filter received in the groove so as to be secure against slipping.

In order to achieve an optimum clamping effect, the cover element beads are advantageously arranged on mutually opposing regions of the sides of the groove. A particularly advantageous embodiment of the present invention is distinguished from the prior art, in particular WO 96 28238 A1, in that a flange with two opposing beads for connecting the cover element to the pleated filter is integrated directly in the cover element, which forms a U-shape for this purpose at least at one location.

The cover element beads are trough-shaped depressions in the cover element and may be pressed into the cover element, for example, mechanically with a beading machine using two beading rollers. Alternatively, the cover element beads may also be produced manually using a beading hammer.

In order to receive the entire axial end region of at least one of the pleated filters, the groove is preferably formed substantially annularly when viewed in a section transverse to the longitudinal axis of the filter element. In order to achieve the most uniform clamping action possible, the cover element beads advantageously encircle the entire circumference of the side of the groove.

The filter element may have two cover elements or end plates, for example, each of which is arranged on opposite axial end regions of the pleated filter. In the case of two cover elements, a structure with cover element beads formed by means of deforming or reforming each cover element is advantageously integrated into both cover elements.

The filter element can have at least two pleated filters, in particular at least one primary pleated filter and at least one secondary pleated filter. In this case, for example, the axial end regions of at least two pleated filters can be received in the groove, in which case each of the pleated filters can be spaced apart from one another by means of at least one spacer, for example at least one insertion element. Thus, for example, only one structure may be integrated into the cover element, so that the cover element forms a U-shape in only one location, for example.

Alternatively, the at least one cover element may have a U-shaped groove for each of the pleated filters. In this embodiment, the at least one cover element forms a U-shape at at least two locations.

The respective at least one U-shaped groove rests directly or indirectly against the outer lateral surface, the inner lateral surface, and the upper surface of the hollow cylindrical pleated filter associated therewith, e.g., through interposition of at least one support tube designed to support the pleated filter.

In a particularly advantageous embodiment of the present invention, the following elements of the filter element, namely the at least one pleated filter, the at least one cover element, optionally, at least one axially acting sealing element arranged in the groove, optionally, at least one particularly metal support tube for supporting the pleated filter and optionally, at least one tube-like, particularly metal protective element, in particular a grid-like, perforated metal support tube, which encloses the outer lateral surface of the pleated filter, are connected to one another in a purely mechanical manner, with the connection being formed solely through deformation of the metal elements of the pleated filter, in particular the cover element and optionally the support tube and/or the protective element.

During the manufacture of the filter element, the pleated filter is first advantageously inserted in a U-shaped groove of the cover element and, in order to connect the pleated filter inserted into the groove of the cover element with the cover element, pressed with the cover element into the two sides of the groove with at least one cover element bead such that the cover element beads clamp the pleated filter so as to be secure against slipping.

Possible applications of the invention can be found in all types of separators which are based on a wound separating medium. Some current examples of these are oil separators with and without flanges as well as oil separation boxes, so-called spin-ons, as well as oil separators as are used for crankcase ventilation.

BRIEF DESCRIPTION OF THE DRAWINGS

As already discussed above, there are various possibilities to form and develop the present invention in an advantageous manner. Further advantages follow from the following description of the drawings. Embodiments of the invention are illustrated in the drawings. The drawings, the description and the claims contain numerous features in combination. A person skilled in the art will also advantageously consider the features individually and produce further sensible combinations thereof. In the drawings:

FIG. 11 shows, in longitudinal sectional representation, detail of an exemplary embodiment of a filter element, in which an axially extending support tube is designed to be longer than an associated pleated filter;

FIG. 12 shows, in longitudinal sectional representation, detail of a variant of the exemplary embodiment according to FIG. 11 with a clamped connection variant of support tube and cover element;

FIG. 13 shows, in longitudinal sectional representation, detail of a variant of the exemplary embodiment according to FIG. 11 with a welded connection of support tube and cover element;

Identical or similar designs, elements, and features are provided with identical reference symbols in the drawings.

DETAILED DESCRIPTION

Figure 1:
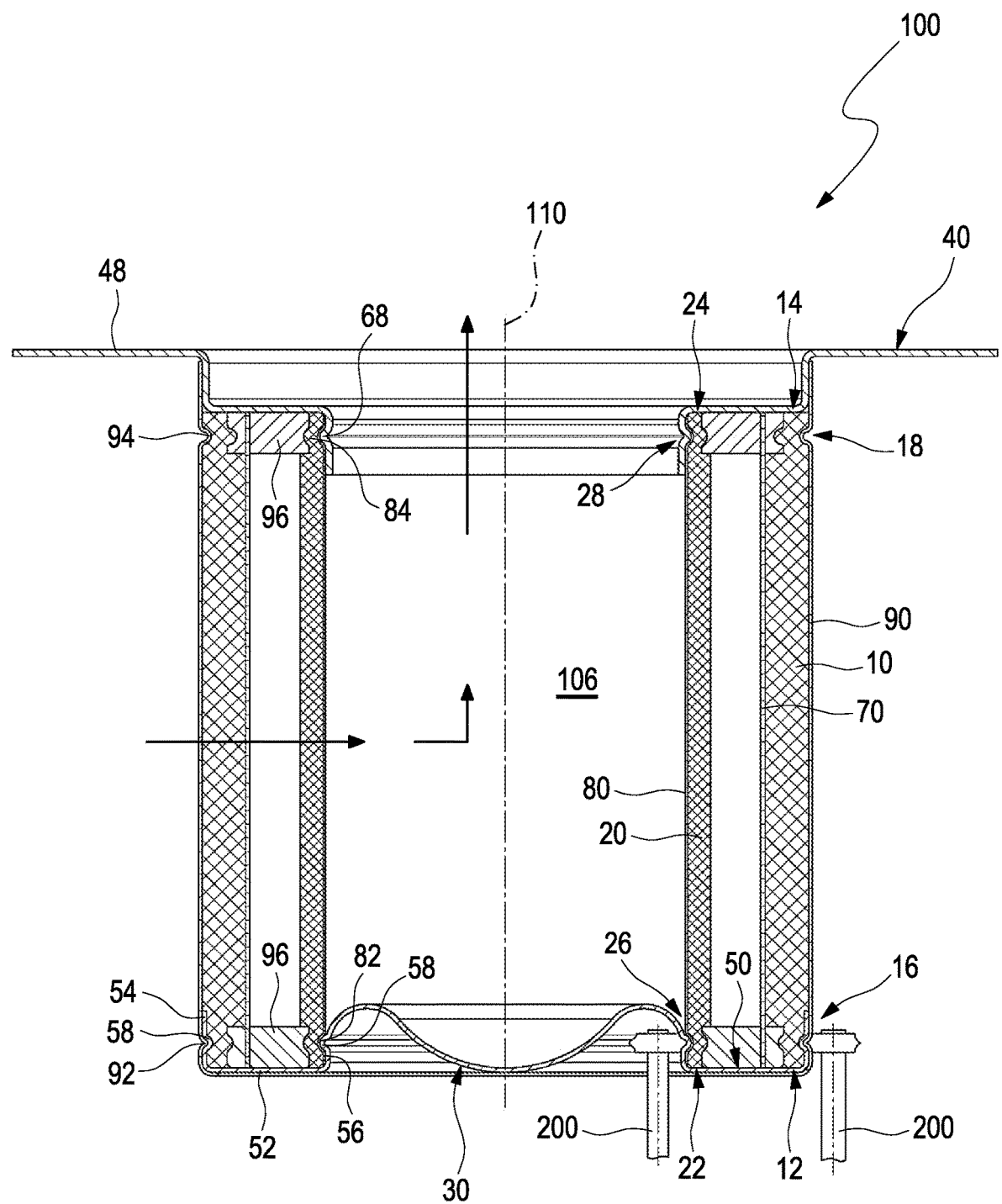
FIG. 1 shows a longitudinal section of a first exemplary embodiment of a filter element according to the present invention, which is manufactured according to the method according to the present invention.
Figure 2:
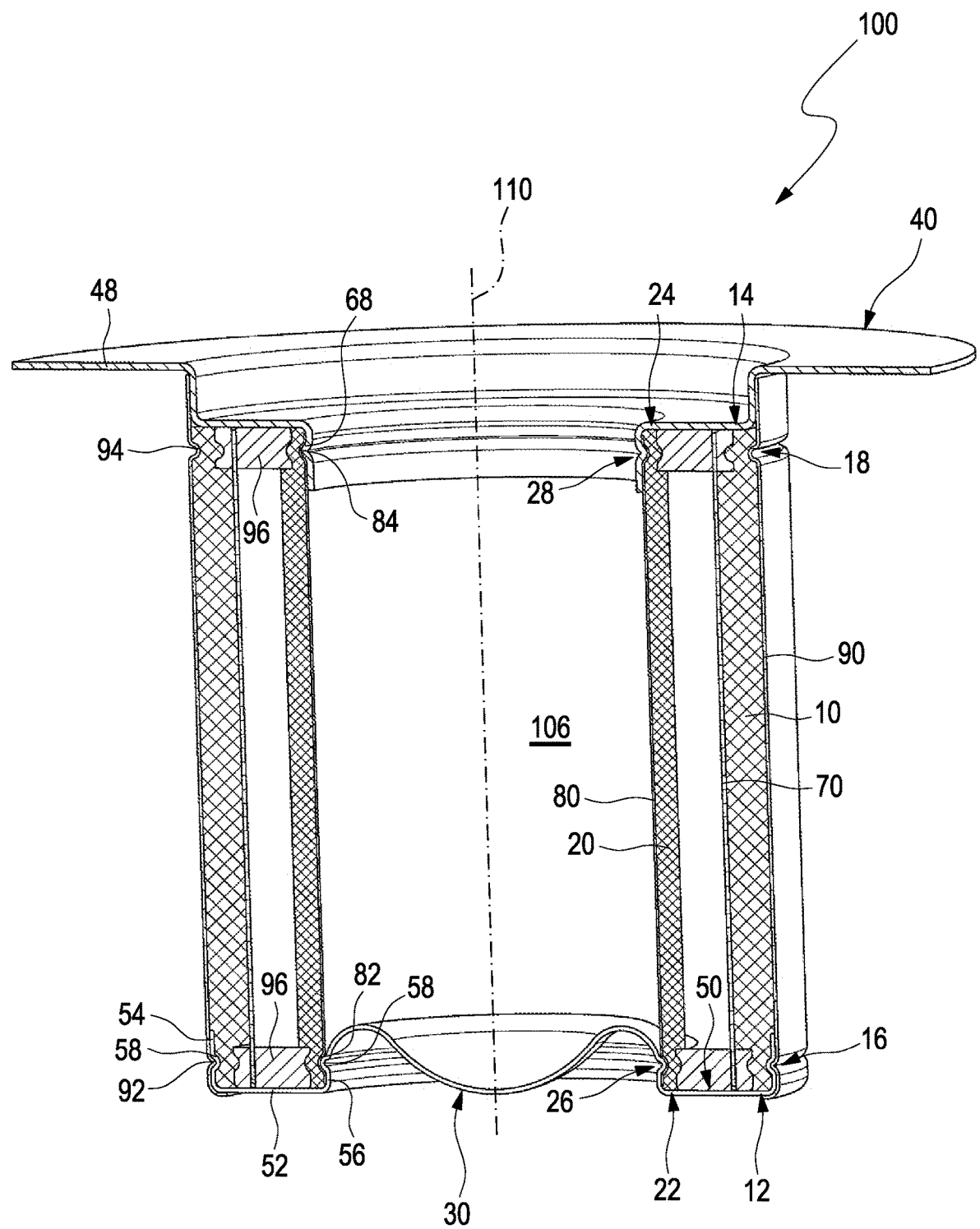
FIG. 2 shows an isometric longitudinal representation of the filter element of FIG. 1 without the bead rollers of the beading machine.
Figure 3:
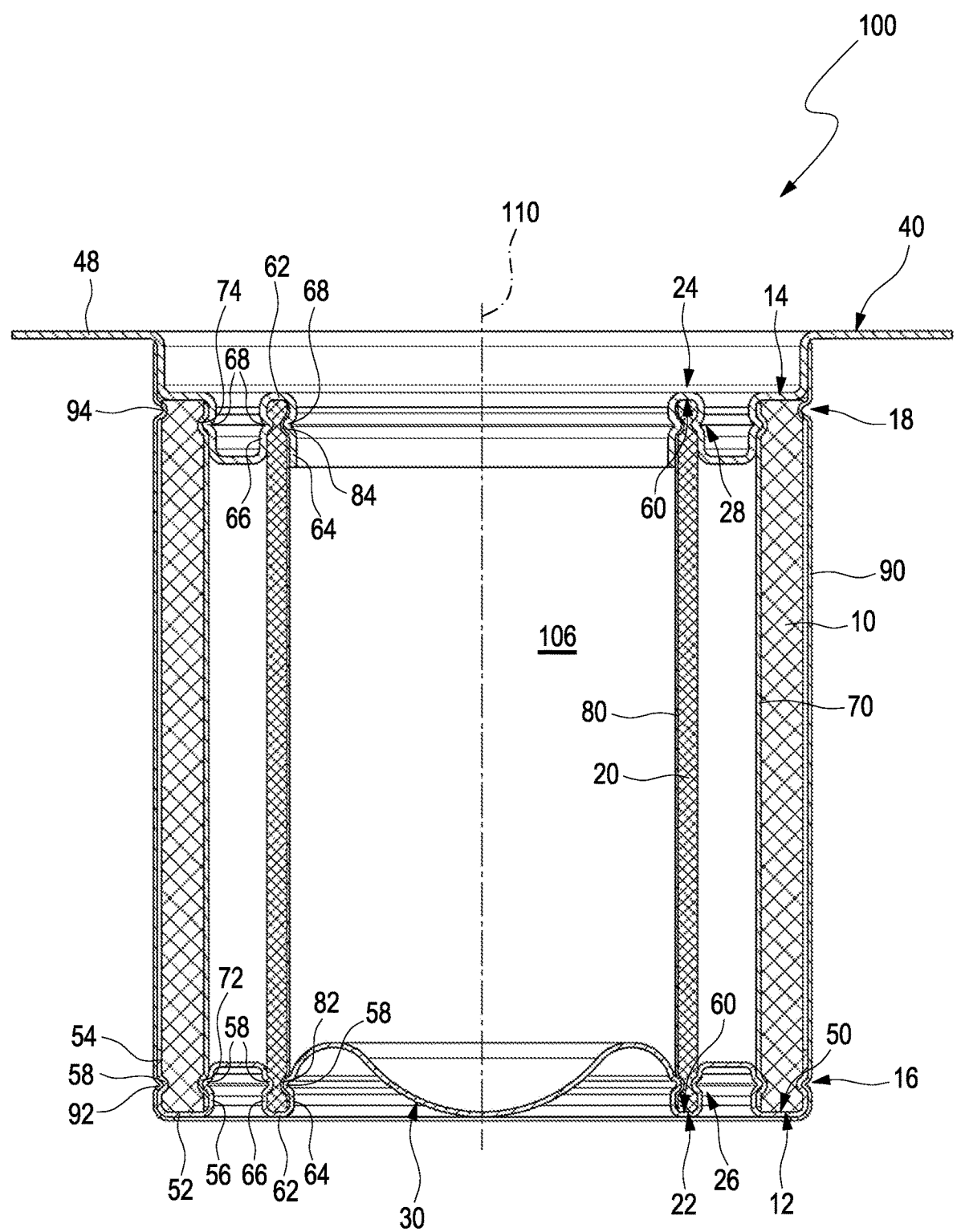
FIG. 3 shows a longitudinal section of a second embodiment of a filter element according to the present invention, which is manufactured according to the method according to the present invention.
Figure 4:
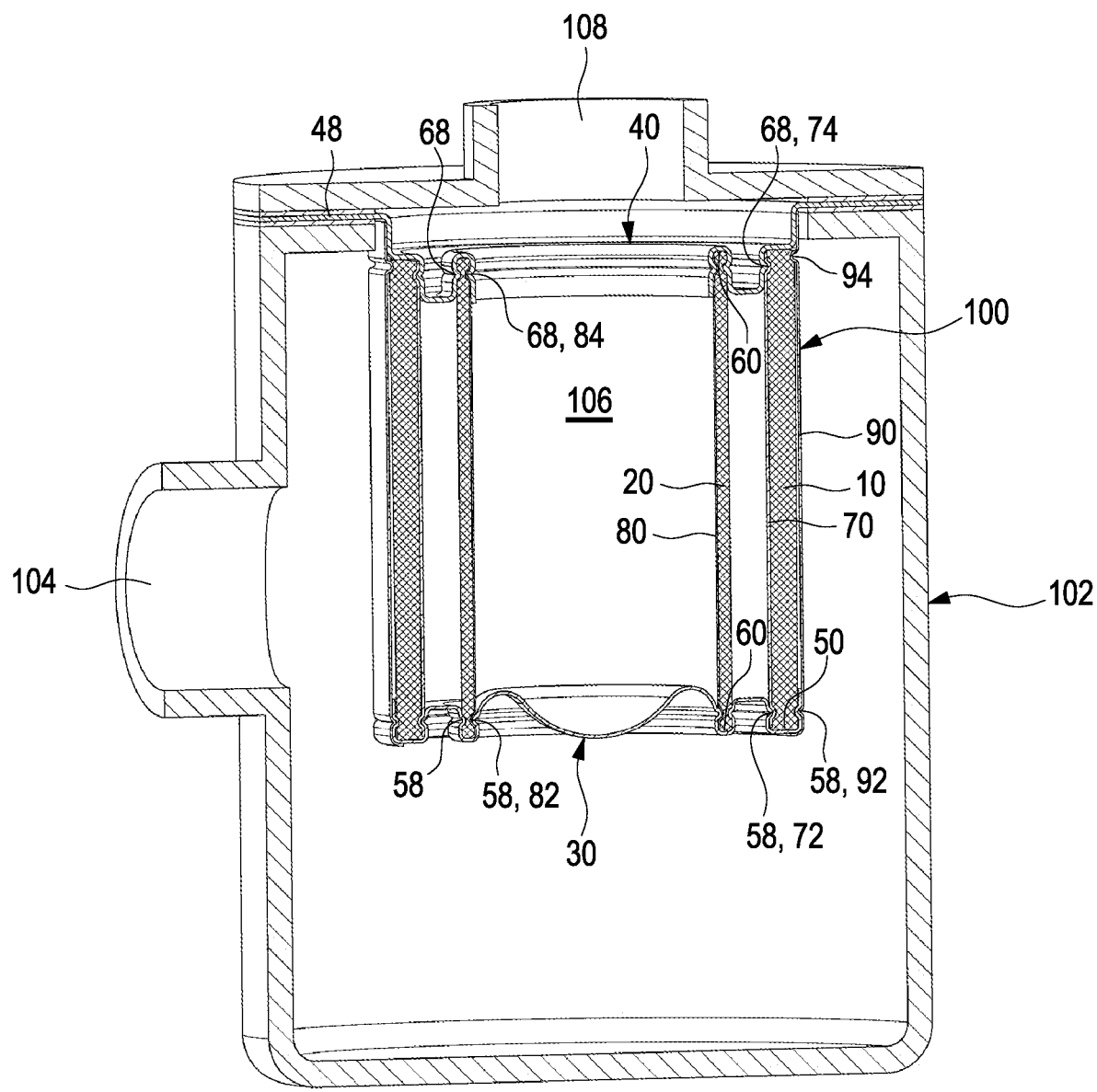
FIG. 4 shows an isometric longitudinal sectional representation the filter element according to FIG. 3, with this filter element being installed in a housing.

To avoid unnecessary repetition, the following explanations with respect to embodiments, features and advantages of the first exemplary embodiment of the present invention relate (in so far as not otherwise indicated) both to the filter element 100 shown in FIGS. 1 and 2 as well as to the filter element 100 shown in FIGS. 3 and 4. The filter element 100 has a longitudinal axis 110 and is preferably formed as a hollow cylinder.

FIG. 1 shows a first embodiment of a filter element 100 during the manufacture thereof. During the manufacture of this filter element 100, two hollow cylindrical pleated filters 10, 20 for separating liquid from an aerosol, namely a primary pleated filter 10 and a secondary pleated filter 20, are connected in a purely mechanical manner to cover elements 30, 40 arranged on the respective end faces of the pleated filter 10, 20, namely to a first end plate 30 and a second end plate 40.

The cover elements 30, 40, in particular the end plates 30, 40, are provided for the purpose of covering the respective axial end region 12, 14 and 22, 24, in particular a front region or a cover surface, of the filter element 10, 20.

The second end plate 40 is a lid designed to cover the filter element 100. The connection between the first end plate 30 and the pleated filters 10, 20 is provided exclusively by deforming or reforming the first end plate 30. In this case, the end plate 30 is deformed or reformed in such a way that the pleated filters 10, 20 are clamped on the end plate 30 so as to be secure against slipping.

The direction of flow of the aerosol to be filtered is marked in FIG. 1 by means of arrows. The end plate 30 has a U-shaped groove 50 for receiving the end face of the pleated filter 10, 20. This U-shaped groove 50 surrounds the entire annular axial end region of the hollow cylindrical pleated filters 10, 20. The groove 50 of the cover element 30 has a bottom 52 with a first side 54 and a second side 56.

In order to achieve an optimal filtering effect, the pleated filters 10, 20 are separated from one another by at least one spacer 96, for example by at least one insertion element.

To produce the connection between the pleated filters 10, 20 and the first end plate 30, at least one cover element bead 58 is pressed on the two sides 54, 56 of the groove 50 by means of bead rollers 200 of a beading machine such that the cover element beads 58 clamp the pleated filters 10, 20 in the groove 50 so as to be secure against slipping. The cover element bead 58 can be designed in particular as a cover element bead in the form of a channel-like depression or knurling of the U-shaped groove 50 of the cover element 30.

FIGS. 3 and 4 show a second exemplary embodiment of a filter element 100 of the present invention. In this second embodiment the end plate 30 has two U-shaped grooves 50, 60. In this case a respective one of the pleated filters 10, 20 is inserted into one of the grooves 50, 60. In this exemplary embodiment, both the first cover element 30 and the second cover element 40, i.e., both the first end plate 30 and also the second end plate 40, are connected to the pleated filters 10, 20 exclusively by deforming or reforming the cover elements 30, 40. The groove 60 has a first side 64 and a second side 66.

FIG. 4 shows the filter element 100 as an insert in a housing 102. In this case, 48 denotes a fastening flange of the filter element 100 designed for fastening the filter insert 100 in a housing 102 (FIG. 4). The fastening flange 48 is arranged at one end of the filter element 100 and surrounds the pleated filters 10, 20 in an annular manner. The fastening flange 48 is clamped between the housing cover and the housing pot.

The housing 102 has a central flow opening 104 in the housing cover for a medium to be filtered to flow in and a lateral outflow opening 108 in the housing pot for the filtered fluid.

In detail, the pleated filters 10, 20 are respectively wound around a support tube 70, 80 in a first method step (i), for example, particularly one made of metal, designed to support the pleated filters 10, 20. In order to prevent the flow of the aerosol flowing through the filter element 100 from being hindered, the support tubes advantageously have perforations or holes. The support tubes 70, 80 are particularly designed as central tubes for supporting the respective pleated filter 10, 20.

In a subsequent method step (ii), the pleated filters 10, 20 with the support tubes 70, 80 are inserted into the at least one groove 60 of the second end plate 40 of the filter element 100. Thus, the at least one groove 60 of the second end plate 40 of the filter element 100 is advantageously formed to also receive at least one of the support tubes 70, 80. In a subsequent method step (iii), the first end plate 30 is placed onto the axial end region of the pleated filters 10, 20, with this axial end region being situated opposite the second end plate 40 or the axial end region 30 of the pleated bellows 10, 20 inserted into the groove 60. Thus, the at least one groove 50 of the first end plate is advantageously designed to receive an axial end region 12, 22 of at least one of the pleated filters 10, 20 and an axial end region of at least one of the support tubes 70, 80.

In a subsequent method step (iv), the two end plates 30, 40, i.e., the first end plate 30 and the second end plate 40, are connected to the pleated filters 10, 20—simultaneously, for example—through the pressing of the cover element beads 58, 68 by means of the technique of beading or flanging. The other cover element bead 68 can particularly be a channel-like depression or knurling of the U-shaped groove 60 of the further cover element 40.

In the second exemplary embodiment of the filter element 100 shown in FIGS. 3 and 4, support tube beads 72, 74, 82, 84 are pressed both into the support tube 70 arranged in the first groove 50 as well as into the support tube 80 arranged in the second groove 50. In the first exemplary embodiment of a filter insert 100 shown in FIGS. 1 and 2, in which both support tubes are arranged in the same groove 50, support tube beads 82, 84 are pressed only into the support tube 80 arranged on the second pleated filter element 20. The support tube beads 72, 74 and 82, 84 are designed to interact with the cover element beads 58 and 68 of the groove 50 or 60 such that the pleated filter 10, 20 clamps in the groove 50 or 60. As shown in FIG. 1, the support tube bead 72, 82 can rest directly against the cover element bead 58, 68 of the end plate 30, 40 associated therewith. The support tube beads 72, 74 or 82, 84 can be embodied, for example, as a channel-like depression or knurling of the respective support tube 70, 80.

In order to facilitate handling of the filter element 100 and to protect a lateral surface of the first filter element 10 opposite an inner cavity 106 of the filter element 100 designed for discharging the purified gas or for supplying the aerosol to be purified, a tube-shaped, particularly metal protective element 90, in particular a grid-like perforated metal protective tube, can be arranged around the lateral surface of the first pleated filter 10 and clamped on the lateral surface of the first pleated filter 10 by means of the technique of beading or flanging. As shown in FIGS. 1 to 4, the protective element 90 may thus comprise at least one in particular circumferential protective element bead 92, 94, wherein the protective element bead 92, 94 is designed to clamp the support element 90 on the outermost lateral surface of the pleated filters 10, 20 so as to be secure against slipping.

In the first exemplary embodiment of a filter element 100 shown in FIGS. 1 and 2, a protective element bead 94 arranged in the region of the second end plate 40 interacts with an opposite cover element bead 68 such that the two pleated filters 10, 20 are clamped between this protective element bead 94 and the opposite cover element bead 68.

In the second exemplary embodiment of a filter element 100 shown in FIGS. 3 and 4, a protective element bead 94 arranged in the region of the second end plate 40 interacts with an opposite cover element bead 68 such that the first pleated filter 10 is clamped between this protective element bead 94 and the opposite cover element bead 68.

In order to seal the connection between the pleated filters 10, 20 and the second end plate 40, at least one axially acting sealing element can be applied, in particular sprayed or laid, onto the bottom 62 of the U-shaped groove 60 of the second end plate 40, for example after clamping of the support element 90 to the outermost lateral surface of the pleated filters 10, 20.

In short, an advantageous embodiment of the method of the present invention comprises the following method steps:

(i) winding the filter material of the pleated filters 10, 20, in particular a non-woven fabric, onto particularly metal support tubes 70, 80;

(ii) inserting the support tubes 70, 80 with an axial end region 14, 24 into the particularly metal end plate 40, in particular into the U-shaped groove 60 of the second end plate 40;

(iii) placing the particularly metal end plate 30 with its at least one U-shaped groove 50 onto the end face (axial end region 12, 22) of the pleated filter 100 opposite the second end plate 40;

(iv) connecting the non-woven fabric winding 10, 20 with the end plate 30 by means of beading and simultaneously connecting the non-woven fabric winding 10, 20 to the second end plate 40 by means of beading;

(v) optionally, arranging the metal protective element or protective screen 90 about the outer-most non-woven fabric winding 10, then beading once again; and (vi) optionally, applying a sealing element to the second end plate 40.

In the two exemplary embodiments of a filter element 100 shown in FIGS. 1 to 4, all elements of these filter elements 100, including all separating media, are connected to one another by purely mechanical means without the use of adhesives or sealants. All elements of the filter elements 100 are connected with one another by means of at least one clamping connection, with the clamping connection being formed solely through deformation of the metal elements of the filter inserts 100. The deformation of the metal elements is achieved by means of the technique of beading or flanging. In this case, the cover elements 30, 40, the support tubes 70, 80 and the protective element 90 are beaded or flanged.

Instead of a beading technique, other connection methods can also be employed.

Figure 5:
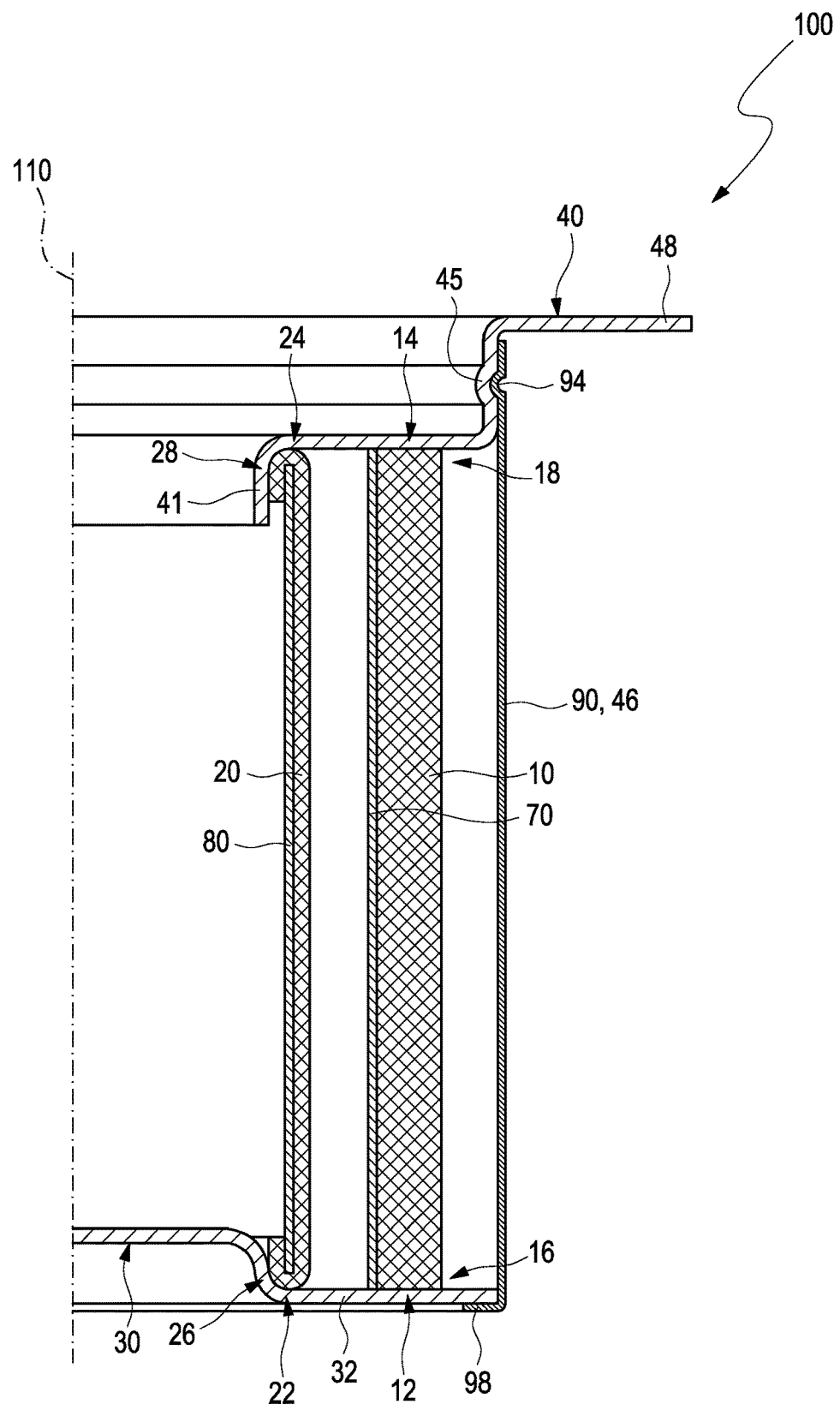
FIG. 5 shows, in longitudinal sectional representation, detail of an exemplary embodiment of a filter element, wherein a protective element arranged radially on the outside serves as a tension anchor.

Such an alternative configuration of the filter element 100 is shown in FIG. 5. FIG. 5 shows, in longitudinal sectional representation, detail of an exemplary embodiment of a filter element 100, wherein a protective element 90 arranged radially on the outside serves as a tension anchor 46. The protective element 90, in particular a protective tube made of metal or plastic, is flanged radially inward on the first cover element 30 and thus forms a radially inner cover 98 which rests against an edge 32 of the first cover element 30 from the exterior. The pleated filters 10, 20 rest against the cover element 30 with their axial end regions 12, 22.

The second cover element 40 is joined, particularly cold welded, to a wall between a planar, annular region which covers the pleated filters 10, 20 on their axial end regions 14, 24 and the fastening flange 48 through a bead 94 in the protective element 90. The second cover element 40 has a bulge 45 at this point.

Two pleated filters 10, 20 are arranged with their support tubes 70, 80 coaxially relative to one another. The second, radially inner pleated filter 20 is laid, in its two end regions 22, 24, as a respective sealing region 26, 28 over its support tube 80 so as to form a seal. On the first cover element 30, the end region 22 of the second pleated filter 20 rests against the step between smooth outer edge 32 and curved interior of the cover element 30, and on the second cover element 40 the overturned end region 24 of the pleated filter 20 rests against an annular, axially inwardly directed portion 41 of the second cover element 40. The first pleated filter 10 lies with its axial end region 12, 14 flush on the cover elements 30, 40, each of which forms a sealing region 16, 18. The fixing of the protective element 90 on the first and the second cover element 30, 40 axially fixes the pleated filters 10, 20, which are gripped between the cover elements 30, 40, while the contact pressure of the pleated filters 10, 20 on the cover elements 30, 40 is maintained.

Figure 6:
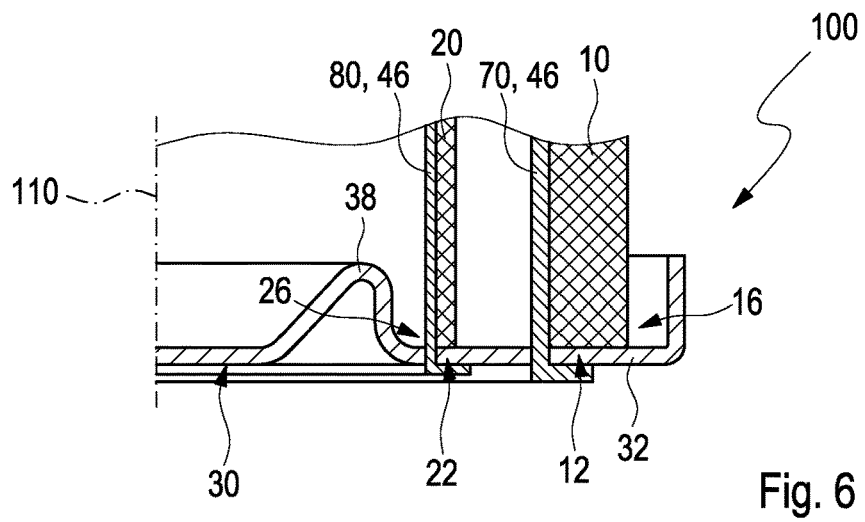
FIG. 6 shows, in longitudinal sectional representation, detail of an exemplary embodiment of a filter element, wherein a support tube serves as a tension anchor.
Figure 7:
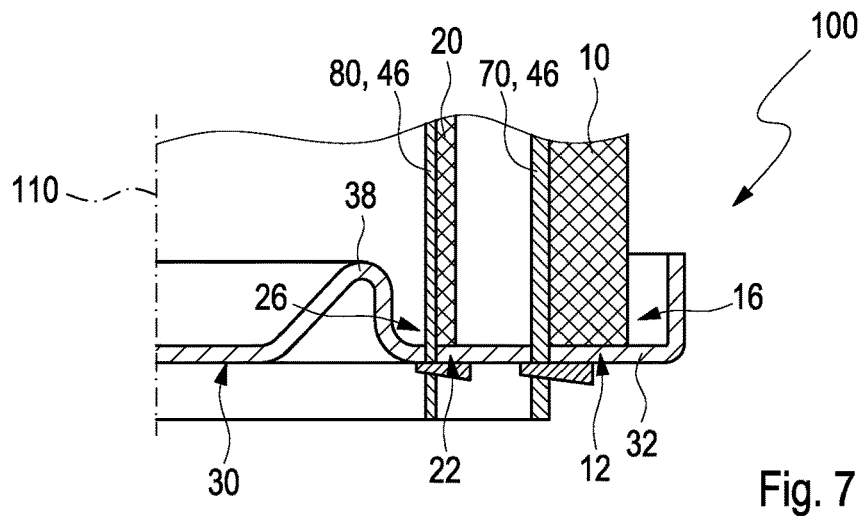
FIG. 7 shows, in longitudinal sectional representation, detail of a variant of the exemplary embodiment in FIG. 6, in which a support tube serves as a tension anchor.
Figure 8:
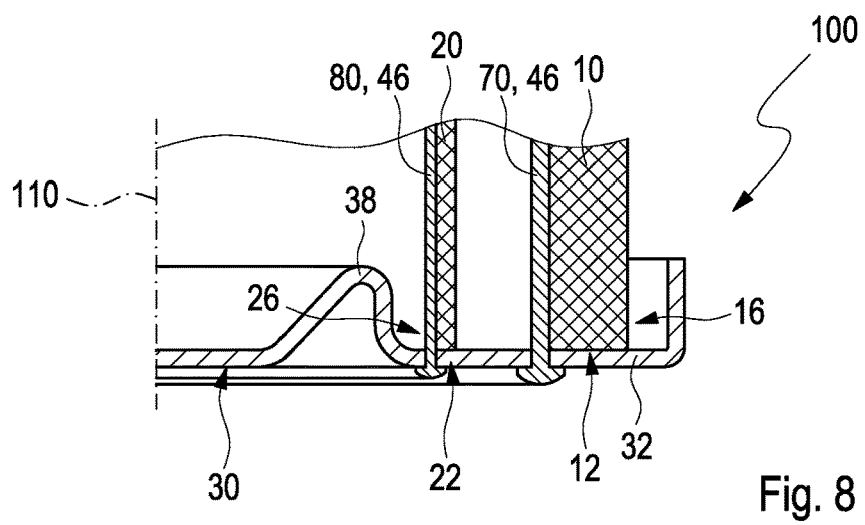
FIG. 8 shows, in longitudinal sectional representation, detail of a variant of the exemplary embodiment in FIG. 6, in which a support tube serves as a tension anchor.

FIGS. 6 to 8 show in longitudinal sectional representation variants of support tubes 70, 80 designed as tension anchors 46. The tension anchor function of the support tubes 70, 80 an axial compression of the end regions 12, 14, 22, 24 of the pleated filters 10, 20. The pleated filters 10, 20 are arranged with their support tubes 70, 80 on the edge 32 of the first cover element 30. The edge 32 can be formed as a groove and can be delimited radially outward by an outer collar and radially inward by an axially inwardly directed bulge 38. The support tubes 70, 80 have an axially greater extension than the pleated filters 10, 20. The end regions 12, 14, 22, 24 of the pleated filters 10, 20 also form the respective sealing regions 16, 18, 26, 28 of the pleated filters 10, 20.

In FIG. 6 the support tubes 70, 80 are in part passed through the edge 32 of the lower cover element 30 and are bent round. FIG. 7 shows a variant in which the support tubes 70, 80 are in part passed through the edge 32 of the first cover element 30 and are fixed by a securing pin or splint. FIG. 8 shows a variant in which the support tubes 70, 80 are in part passed through the edge 32 of the first cover element 30 and are hammered in, so that a tensile stress can be applied by the support tubes 70, 80.

At the opposite end of the filter element 100, the support tubes 70, 80 can be fastened to the second cover element 40 in the same way or as in the embodiments described above or below.

Figure 9:
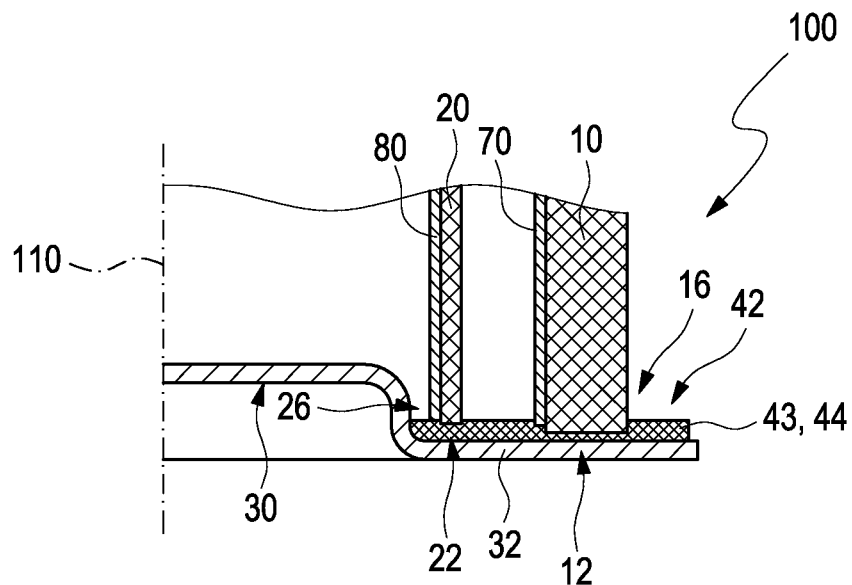
FIG. 9 shows, in longitudinal sectional representation, detail of an exemplary embodiment of a filter element, in which a pleated filter unit is used for axial sealing.
Figure 10:
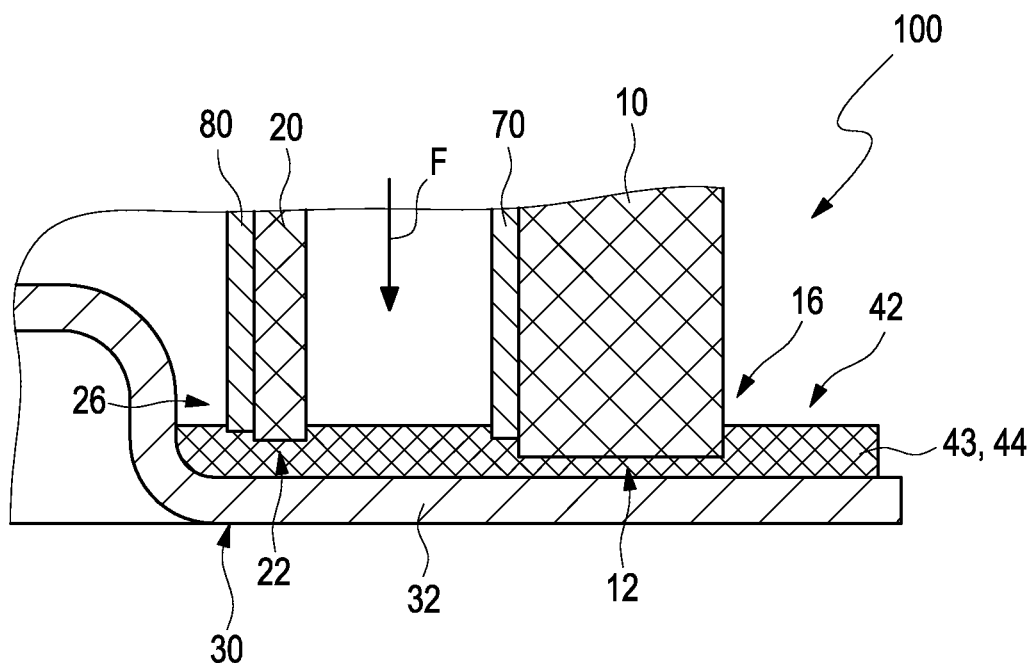
FIG. 10 shows, in longitudinal sectional representation, detail of the exemplary embodiment according to FIG. 9.

FIG. 9 shows, in longitudinal sectional representation, detail of an exemplary embodiment of a filter element 100, in which a pleated filter unit 42 is used for axial sealing. FIG. 10 shows, in longitudinal sectional representation, detail of the exemplary embodiment according to FIG. 9. The pleated filter unit 42 respectively comprises the pleated filter 10, 20 and a further pleated filter 44 in the form of a flat ring 43. The ring 43 is arranged on the edge 32 of the first cover element 30 below the two pleated filters 10, 20. The pleated filters 10, 20 press axially with a force F into the ring 43 and compress it, so that an axial sealing takes place at least through the ring 43. The pleated filter unit 42 on the first cover element 30 is axially longer than the support tubes 70, 80. The respective pleated filter 10, 20 advantageously has, on the end nearest the cover element, at least the same axial extension as, preferably a greater axial extension than the associated support tube 70, 80.

At the opposite end of the filter element 100 the support tubes 70, 80 can be fastened to the second cover element 40 in the same way or as in the embodiments described above or below.

FIG. 11 shows, in longitudinal sectional representation, detail of an exemplary embodiment of a filter element 100. FIG. 12 shows detail of a variant of the exemplary embodiment according to FIG. 11 with a clamped connection variant of support tube 70 and cover element 30 for axial fixation, and FIG. 13 shows detail of a variant of the embodiment according to FIG. 11 with a welded connection of support tube 70 and cover element 30.

The first support tube 70 is longer in its axial extension than the associated first pleated filter 10. On the other hand, the support tube 80 with the second pleated filter 20 is shorter than the pleated filter 20, with at least the end region 22 of the pleated filter 20 which is lower in the drawing being bent over the lower end of the support tube 80. A groove 31, in which the first support tube 70 projects with its axial projection relative to its pleated filter 10 and rests against the radially outer groove wall, is connected radially inward to the outer edge 32 of the first cover element 30. The second support tube 80 with the bent-over end region 22 of the pleated filter 20 protrudes into the groove 31 and rests against the radially inner wall of the groove 31. In this way, the first pleated filter 10 with its end region 12 compressed at the axial end and the bent-over end region 22 of the second pleated filter 20, as a respective sealing region 16, 26 of the pleated filters 10, 20, provide sealing. A sufficient sealing effect is achieved through the axial compression of the first and second pleated filter 10, 20.

In FIG. 12, the radially outer wall of the groove 32 is pressed radially inward at least in part, so that an undercut 33 on which the support tube 70 can engage is formed on the groove wall. In FIG. 13, the groove wall remains substantially straight, and the support tube 70 with its projection is at least in part welded to the radially outer wall of the groove 31.

At the opposite end of the filter element 100, the support tubes 70, 80 can be fastened to the second cover element 40 in the same way or as in the designs described above or below.

Figure 14:
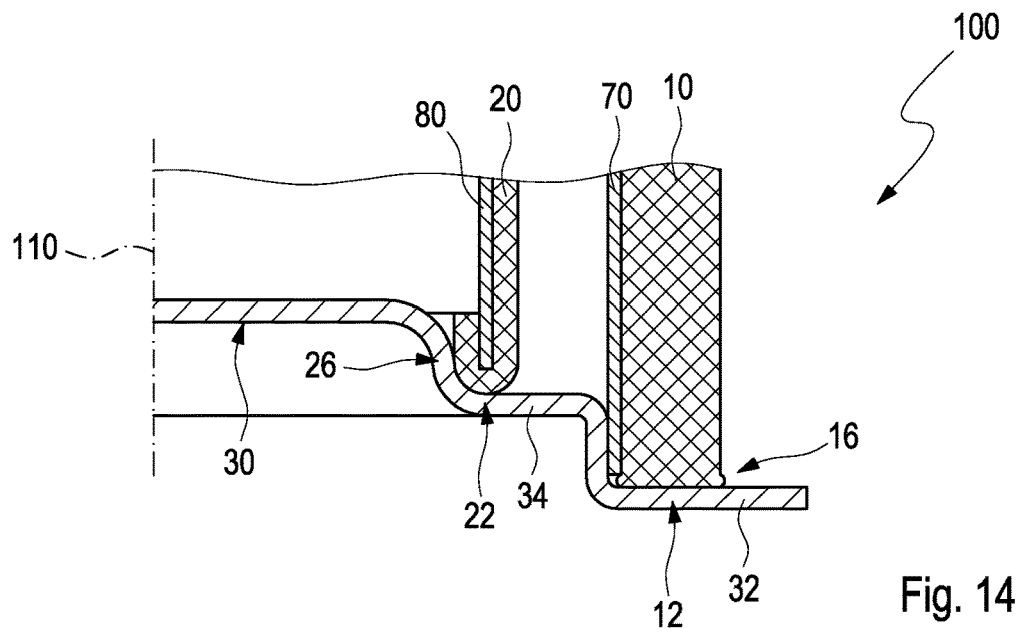
FIG. 14 shows, in longitudinal sectional representation, detail of an exemplary embodiment of a filter element, in which a pleated filter has a greater axial extension than the support tube.
Figure 15:
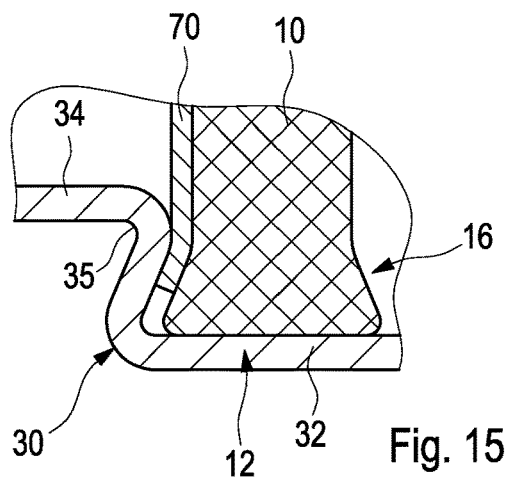
FIG. 15 shows, in longitudinal sectional representation, detail of a variant of the exemplary embodiment in FIG. 14, with an interlocked connection variant of support tube and cover element.
Figure 16:
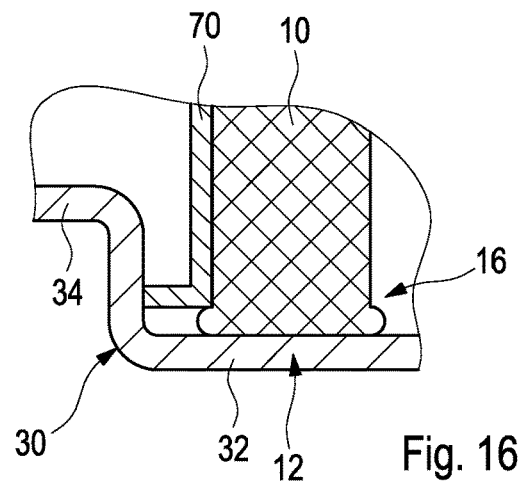
FIG. 16 shows, in longitudinal sectional representation, detail of a variant of the exemplary embodiment in FIG. 14, with a joining step between support tube and cover element.
Figure 17:
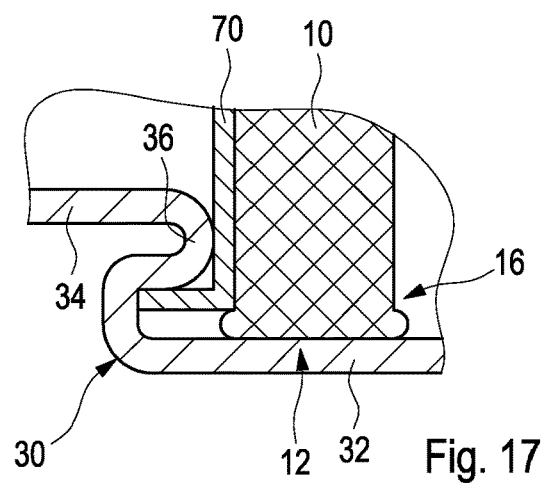
FIG. 17 shows, in longitudinal sectional representation, detail of the variant of the exemplary embodiment in FIG. 16, with a deformation step following the joining step.

FIG. 14 shows, in longitudinal sectional representation, detail of an exemplary embodiment of a filter element 100, in which a pleated filter 10, 20 has a greater axial extension than the support tube 70, 80. FIG. 15 shows detail of a variant of the exemplary embodiment in FIG. 14, with an interlocked connection variant of support tube 70 and first cover element 30. FIG. 16 shows detail of a variant of the exemplary embodiment in FIG. 14, with a joining step between support tube 70 and first cover element 30, and FIG. 17 shows detail of the variant in FIG. 16, with a deformation step following the joining step.

The pleated filters 10, 20 are arranged on the first cover element 30, which is formed with steps rising inward. Starting from the outer edge 32, on which the first pleated filter 10 with support tube 70 is arranged, this is followed by a raised plateau 34, followed by a further raised portion. The first support tube 70 can abut the transition between the edge 32 and the plateau 34. The second support tube 80 abuts the transition between the plateau 34 and the further raised portion.

A connection between the support tube 70 and the first cover element 30 can be provided, for example, by welding at least in some regions.

As is shown in FIG. 15, a connection can be achieved between the support tube 70 and the first cover element 30 by pressing the transition between plateau 34 and edge 32 radially outward at least in portions, whereupon a kink 35 is formed on which the support tube 70 can interlock.

It is also conceivable for the support tube 70 to have a collar at its free end, as illustrated in FIG. 16. The collar can be welded at least in some regions to the cover element 30. Alternatively, as illustrated in FIG. 17, a bead 36 which securely clamps the collar of the support tube 70 is, for example, pressed into the transition which is deformed at least in some regions between plateau 34 and edge 32.

The first pleated filter 10, as well as optionally the second pleated filter 20, is gripped between the first cover element 30 and the second cover element (not shown). At the opposite end of the filter element 100 the support tubes 70, 80 can be fastened to the second cover element in the same way or as in the designs described above or below.

Figure 18:
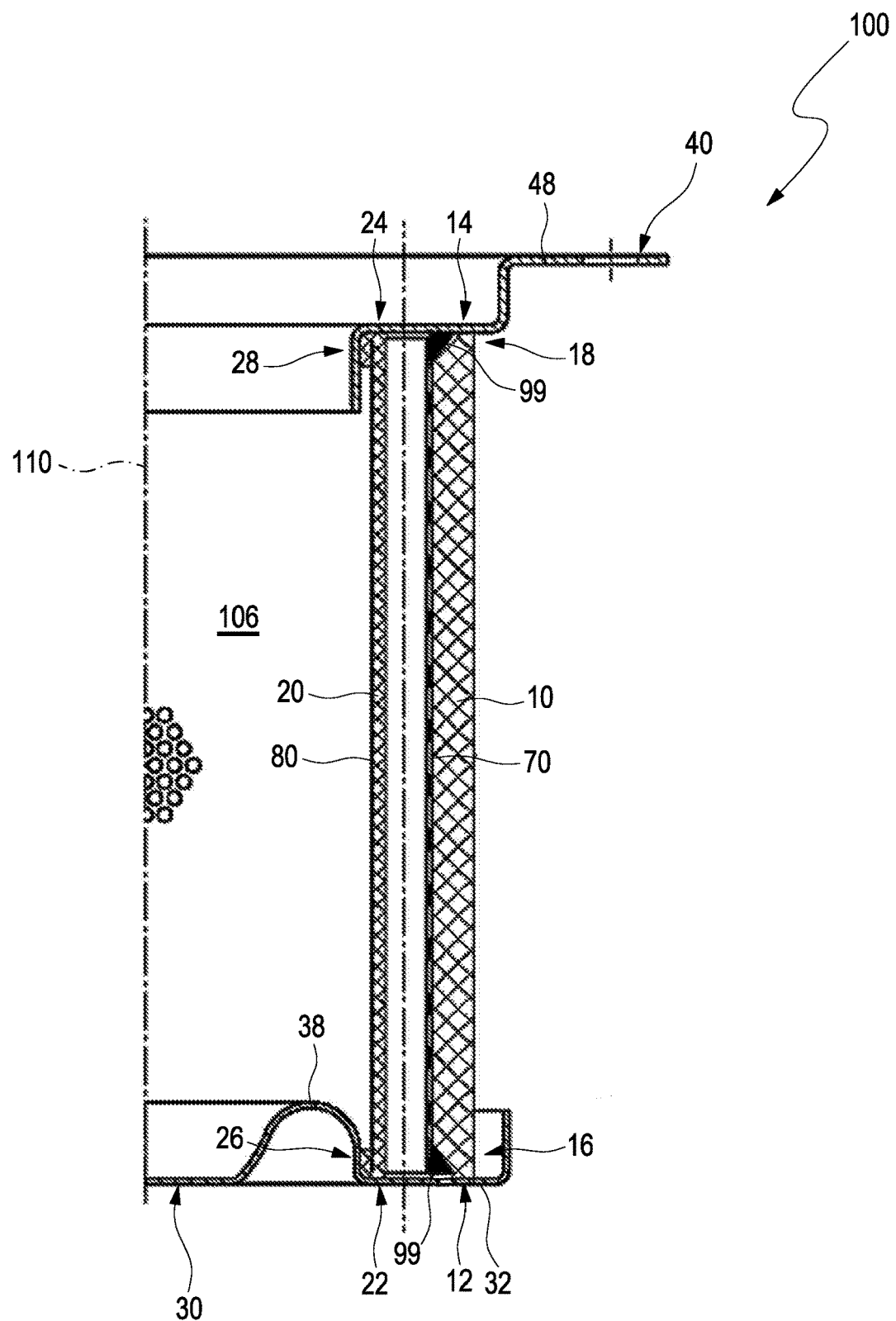
FIG. 18 shows, in longitudinal sectional representation, detail of an exemplary embodiment of a filter element, wherein a support tube is welded to a cover element.

FIG. 18 shows, in longitudinal sectional representation, detail of an exemplary embodiment of a filter element 100, wherein the first support tube 70 is at least welded to the first and second cover elements 30, 40. Before the welding, the first pleated filter 10 can be gripped axially under pretension between the cover elements 30, 40 and can be fixed axially by the weld. The weld 99 can be provided as a weld seam or as individual spot welds. The weld 99 can be provided on the outer face of the support tube 70.

Figure 19:
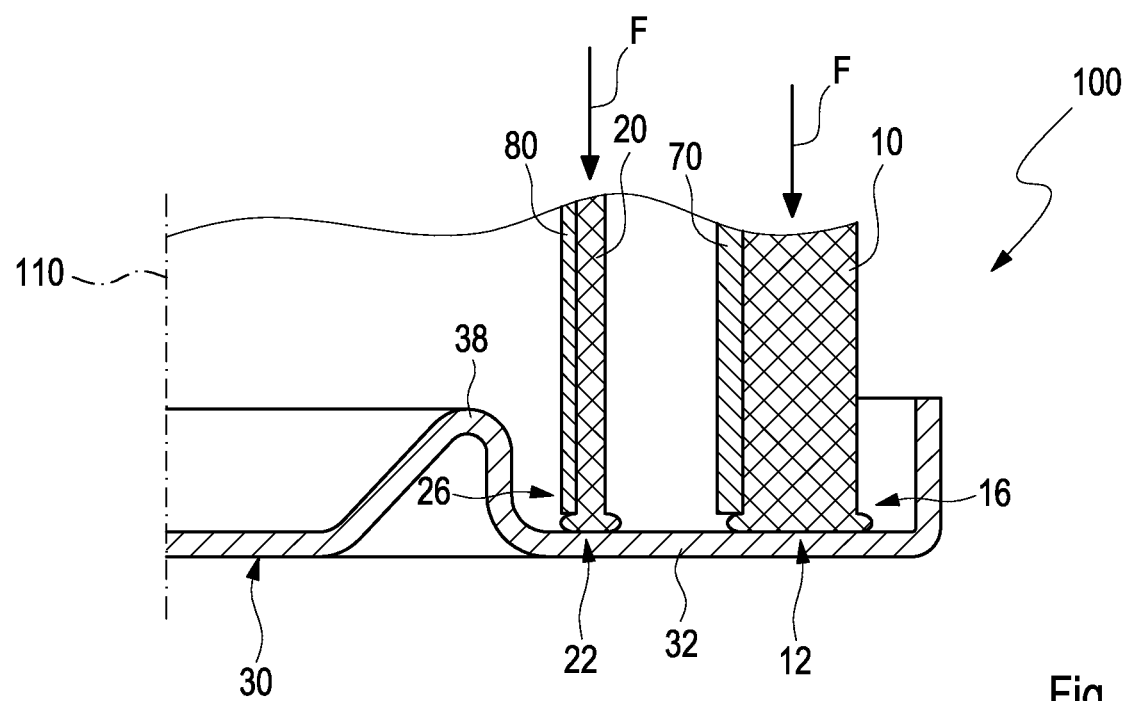
FIG. 19 in longitudinal sectional representation detail of an exemplary embodiment of a filter element, wherein a support tube is to be welded to a cover element.

FIG. 19 in longitudinal sectional representation detail of an exemplary embodiment of a filter element 100, wherein a support tube 70 is to be welded to a cover element 30. The pleated filters 10, 20 are longer in the axial direction, at least on the end facing the cover element 30, than their support tubes 70, 80. The pleated filters 10, 20 are arranged with their support tubes 70, 80 on the outer edge 32 of the first cover element 30 and are pressed with a force F against the cover element 30, which is indicated by arrows pointing in the direction of the cover element 30. Proceeding radially inward from the edge 32, an axially inwardly directed bulge 38 can be provided in the cover element 30.

The axial end regions of the pleated filters 10, 20 are pressed and thereby compressed, so that when they lie flush against the cover element 30 they have a sufficient sealing function. Subsequently the outer support tube 70 can be welded, for example, on its inner contact surface to the cover element 30. The weld 99 can be provided, for instance, by spot welding or by a continuous or relatively long weld seam, as indicated in FIG. 20.

Figure 20:
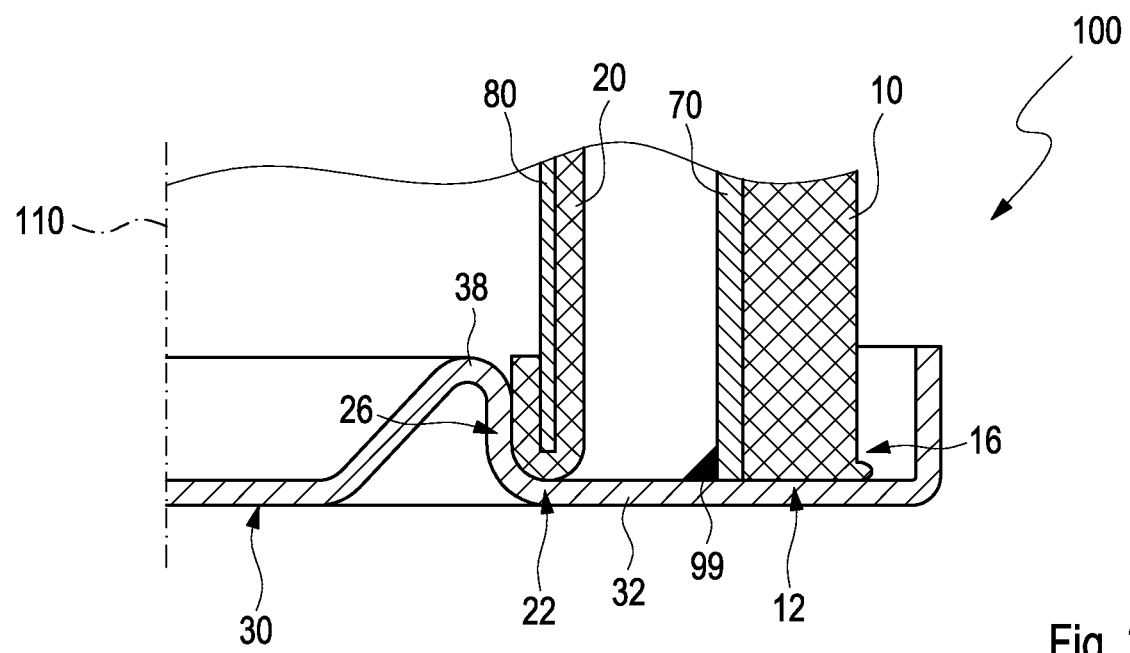
FIG. 20 shows, in longitudinal sectional representation, detail of the exemplary embodiment of a filter element according to FIG. 19, wherein a support tube is welded to a cover element.

FIG. 20 also shows a variant of the exemplary embodiment according to FIG. 19, wherein the second pleated filter 20 is laid with its free end over the second support tube 80. In this case, the second support tube 80 can rest against the bulge 38. The bent-round end of the second pleated filter 20 ensures sufficient sealing.

At the opposite end of the filter element 100, the support tubes 70, 80 can be fastened to the second cover element 40 in the same way or as in the embodiments described above.

What is claimed is:

1. A filter element for installation in a housing, comprising:
    at least one substantially hollow cylindrical pleated filter for separating liquid from aerosol; and
    two cover elements designed to cover axial end regions of the pleated filter,
    wherein the axial end regions of the at least one pleated filter are each pressed against the cover element by an axial compressing force,
    wherein the at least one pleated filter is fixed in the axial direction; and
    a respective sealing zone is formed between pleated filter and cover element,
    wherein the axial compression is formed by welding a member selected from the group consisting of at least one of a support tube and a tension anchor and a mechanical connection to at least one of the cover elements; and
    the pleated filter is formed purely by means of a structure of the cover element produced through deforming or reforming of the cover element, with the structure of the cover element being designed to clamp the pleated filter on the cover element,
    wherein a purely mechanical connection between one of the cover elements and the pleated filter is formed purely by means of a structure of the cover element produced through deforming or re-forming of the cover element, with the structure of the cover element being designed to clamp the pleated filter on the cover element,
    wherein the structure of at least one of the cover elements has at least one groove having two sides and a bottom which is substantially U-shaped when seen in a section along the longitudinal axis of the filter element, and
    at least one respective cover element bead arranged on two sides of the groove,
    wherein in the position of use of the filter element:
        the groove receives the axial end region of at least one of the pleated filters;
        the bottom of the groove rests directly or indirectly against the axial end region of the filter element received in the groove and the two sides of the groove extend parallel to the lateral surface of the pleated filter received in the groove; and the cover element beads clamp the pleated filter received in the groove into the groove so as to be secure against slipping, wherein at least one metal support tube is configured to support the pleated filter, wherein the groove is additionally formed to receive the support tube or at least one of the support tubes, and wherein the support tube has at least one support tube bead, which is configured to interact with the cover element beads of the groove such that the pleated filter is clamped in the groove, wherein the support tube bead, rests directly against one of the cover element beads.

2. The filter element according to claim 1, wherein at least one of the sealing regions between pleated filter and the respective cover element is respectively formed by the axial end region of the at least one pleated filter, which lies flush against the respective cover element.

3. The filter element according to claim 1, wherein at least one of the sealing regions is formed by a pleated filter unit, wherein the axial end region of the pleated filter is arranged lying against at least one annular pleated filter.

4. The filter element according to claim 1, wherein one or more traction rods can be passed through the cover elements.

5. The filter element according to claim 1, wherein for axial compression, at least one of the at least one support tube is welded to at least one of the cover elements.

6. The filter element according to claim 1, wherein an axial extension of the pleated filter is greater than an axial extension of its support tube.

7. The filter element according to claim 1, wherein the cover element beads are arranged on mutually opposite regions of the sides of the groove.

8. The filter element according to one of claim 1, wherein,
when seen in a section transverse to the longitudinal axis of the filter element, the groove is substantially annular and the cover element beads encircle the entire circumference of the sides of the groove.

9. The filter element according to claim 1, wherein the at least one pleated filter comprises at least two pleated filters, wherein the axial end regions the two pleated filters are received in the groove, with the respective pleated filters being spaced apart from one another by means of at least one spacer.

10. The filter element according to claim 1, wherein at least two pleated filters are a primary pleated filter and a secondary pleated filter, wherein the cover element or at least one of the cover elements has a U-shaped groove for each of the pleated filters.

11. The filter element according to claim 1, wherein at least one tube-shaped metal protective element, configured as a grid-like perforated metal protective tube, is provided which completely surrounds the outer lateral surface of the pleated filter facing away from the inner cavity of the filter element for discharging the purified gas or for supplying the aerosol to be purified, wherein the protective element has at least one circumferential protective element bead, and wherein the protective element bead is designed to clamp the protective element on the outer lateral surface of the pleated filter or the outermost lateral surface of the pleated filter so as to be secure against slipping.

12. The filter element according to claim 11, wherein the protective element bead is designed to interact with at least one of the cover element beads such that the cover element is clamped in the protective element, such that the protective element bead rests directly against the cover element bead.

* * * * *